(12) United States Patent
Hsu

(10) Patent No.: US 6,253,284 B1
(45) Date of Patent: Jun. 26, 2001

(54) MEMORY MODULE CONTROLLING SYSTEM

(75) Inventor: Hsien-Yueh Hsu, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 09/246,760

(22) Filed: Feb. 8, 1999

(30) Foreign Application Priority Data

Nov. 9, 1998 (TW) ................................................. 87118598

(51) Int. Cl.[7] ..................................................... G06F 13/00
(52) U.S. Cl. .................................. 711/115; 326/30; 365/63
(58) Field of Search ............................. 326/30; 711/170, 711/115, 5; 710/126, 131, 129; 361/684; 365/52, 63

(56) References Cited

U.S. PATENT DOCUMENTS 5,313,595 * 5/1994 Lewis et al. .............................. 326/30
5,663,661 * 9/1997 Dillon et al. ............................. 326/30
5,740,386 * 4/1998 Miller et al. .......................... 710/129
6,058,444 * 5/2000 Johnson .................................. 326/30
6,067,594 * 5/2000 Perino et al. ......................... 710/129

* cited by examiner

Primary Examiner—Do Hyun Yoo
Assistant Examiner—Yamir Encarnacion
(74) Attorney, Agent, or Firm—Jiawei Huang; J. C. Patents

(57) ABSTRACT

A memory module controlling system. The controlling system has a multiplexer, an automatic detector and a terminal device. The system has several slots with each slot having a signaling line to the automatic detector so that the presence or absence of a memory module in each slot can be determined. The automatic detector gathers all the signals from the slots and is able to relay a control signal to the multiplexer. The signal output terminal of each slot is coupled to the input terminals of the multiplexer, and the output terminal of the multiplexer is coupled to the terminal device. As soon as the multiplexer receives a control signal regarding the state of the memory slots from the automatic detector, one of the input terminals of the multiplexer automatically connects to its output terminal. Hence, the output signal from the last memory-plugged slot is connected to the terminal device, thereby forming a complete data and clock pulse transmission channel.

19 Claims, 6 Drawing Sheets

MEMORY MODULE CONTROLLING SYSTEM

CROSS-REFERENCE TO RELATED APPLICATION

This application claims the priority benefit of Taiwan application serial no. 87118598, filed Nov. 9, 1998, the full disclosure of which is incorporated herein by reference.

BACKGROUND OF THE INVENTION

1. Field of Invention

The present invention relates to a memory module controlling system. More particularly, the present invention relates to a system for controlling a high-speed memory module.

2. Description of Related Art

Memory is one of the most important components in a computer system. At present, dynamic random access memories (DRAMs) are one of the most commonly used memory chip. The development of DRAM is extremely fast these days. Memory capacity has increased from the former 1K bits per chip to more than 64M bits now. Although storage capacity has increased many folds, operating efficiency of DRAM has not improved that much. Compared with a processing device such as a microprocessor, the operating efficiency of DRAM is so poor that it can hardly match the speed of the microprocessor. Consequently, a number of complicated and expensive controlling systems are developed, mainly to increase the operating efficiency of memories. For example, synchronous random access memory caches (SRAM caches) and parallel arrays of DRAMs are recently developed memory controlling systems.

To resolve the problems of having a low operating efficiency and a complicated controlling scheme, Rambus corporation has developed a memory controlling system having a chip-to-chip bus interface, and has defined the protocols for its modular connection. This type of memory controlling system that follows a pre-defined set of rules for communication is generally referred to as having a direct Rambus channel configuration. Memories can be directly connected to a microprocessor, graphic processor or ASICs through a direct Rambus channel. The Rambus channel requires only a few high frequency carrier lines for carrying all the necessary information such as memory address, digital data and control signals. Memory module that uses the direct Rambus channel design approach and the protocols of communication are known as a Rambus DRAM module or a RIMM for short.

FIGS. 1A, 1B and 1C are respectively a four-channel, a two-channel and a single channel direct Rambus channel type of memory and its control interfaces. Memory chips 10 are connected serially together through a direct Rambus channel 12, and finally attached to a control interface 16 of a memory controller 14. As shown in FIGS. 1A through 1C, all the memory chips 10 are divided between channel groups with the memory chips 10 in each group connected serially together via a single channel 12. Since each channel 12 has a minimum data transmission rate of about 1.6G bits, the data transmission rates for the memory modules in FIGS. 1A, 1B and 1C are 6.4G bits, 3.2G bits and 1.6G bits, respectively. Hence, RIMM memory module is able to have a high operating efficiency but a low cost of production.

Although RIMM memory modules can operate at a very high speed, a high operating frequency of up to 400 MHz must be supplied. Hence, a terminal must be installed at the terminal of a channel for preventing reflection of high frequency signals.

FIG. 2A is a sketch showing a RIMM having three RIMM memory modules 20a, 20b and 20c plugged into their respective memory slots. Through a single channel 24, all the memory chips 22a, 22b and 22c in all three modules are connected serially together. The module 20a is connected to the control interface 26a of the memory controller 26 via the channel 24. The last module 20c is connected to a terminal 28 and a clock pulse generator 29 via the same channel 24. Therefore, the memory controller 26, the memory modules 20a, 20b, 20c and the terminal 28 together form a complete signaling circuit. However, if only a single RIMM memory module is plugged into any one of the memory slots, a complete circuit between the memory controller 26, the single memory module and the terminal 28 cannot be established. Under this circumstance, normal practice is to plug dummy RIMM modules such as 20b' and 20c' into the empty slots, as shown in FIG. 2B. Each of these dummy RIMM modules do not have memory chips like a RIMM memory module, instead each dummy module only contains a circuit channel for passing signals. Hence, a complete circuit linking the memory controller 26, the memory module 20a, the terminal 28 and the clock pulse generator 29 is now established, and information regarding memory address, data and control signals can be transmitted.

Therefore, the solution to signal cutoff when some slots contain no RIMM memory is to plug in dummy modules having a channel circuit therein as a substitute. By so doing, all the memory slots are occupied. The dummy modules must be unplugged whenever additional RIMM memory modules need to be installed. In addition, the fabrication of dummy modules adds to the cost of production.

In light of the foregoing, there is a need to provide an easier method of connecting RIMM memory modules that can save cost.

SUMMARY OF THE INVENTION

Accordingly, the purpose of the present invention is to provide a memory module controlling system that uses a simple method to form a complete signaling circuit linking memory modules, a terminal and a clock pulse generator.

In a second aspect, the invention provides a memory module controlling system that can detect state of occupation of the memory slots, and then forming channel connection between the last memory-occupied slot and a terminal device automatically.

To achieve these and other advantages and in accordance with the purpose of the invention, as embodied and broadly described herein, the invention provides a memory module controlling system. The memory module controlling system of this invention is capable of detecting the state of occupation of its memory slots such that a complete signaling channel between the memory modules and its terminal device can be established automatically. The memory module controlling system further comprises a multiplexer, an automatic detector and a terminal device. Each memory slot in the system transmits a signal to the automatic detector so that the state of occupation of each memory slot can be determined. Ultimately, a controlling signal reflecting the state of occupation of the slots is sent to the multiplexer.

Channel signals from each memory slot are transmitted to various input terminals of the multiplexer; meanwhile the output terminal of the multiplexer is connected to the terminal device. By sensing the controlling signal emitted from the automatic detector, the multiplexer is able to select one of its input terminals and connect to its output terminal internally. Consequently, the very last slot having a plugged-in memory module can be automatically connected to a terminal device, thereby forming a complete signaling channel for the transmission of data and clock pulses. Since empty slots can be automatically detected, there is no need to plug in dummy memory modules.

By providing a simple controlling circuit in the memory controlling system, the terminal device of this system can be connected to the very last slot having a plugged-in memory. Hence, a complete signal transmission channel is established. Therefore, cost of production can be reduced, and the product can be more competitive in the market.

In addition, there is no need to plug dummy memory modules into empty slots. Furthermore, users are free to add memory modules into empty slots or dismantle some memory modules from the memory slots without the need to worry about putting back a terminal device in the very last, memory-occupied slot. This is because not only is the correct slot for connecting with a terminal device automatically determined, but the action of connecting the terminal device with the correct slot is carried out automatically as well.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
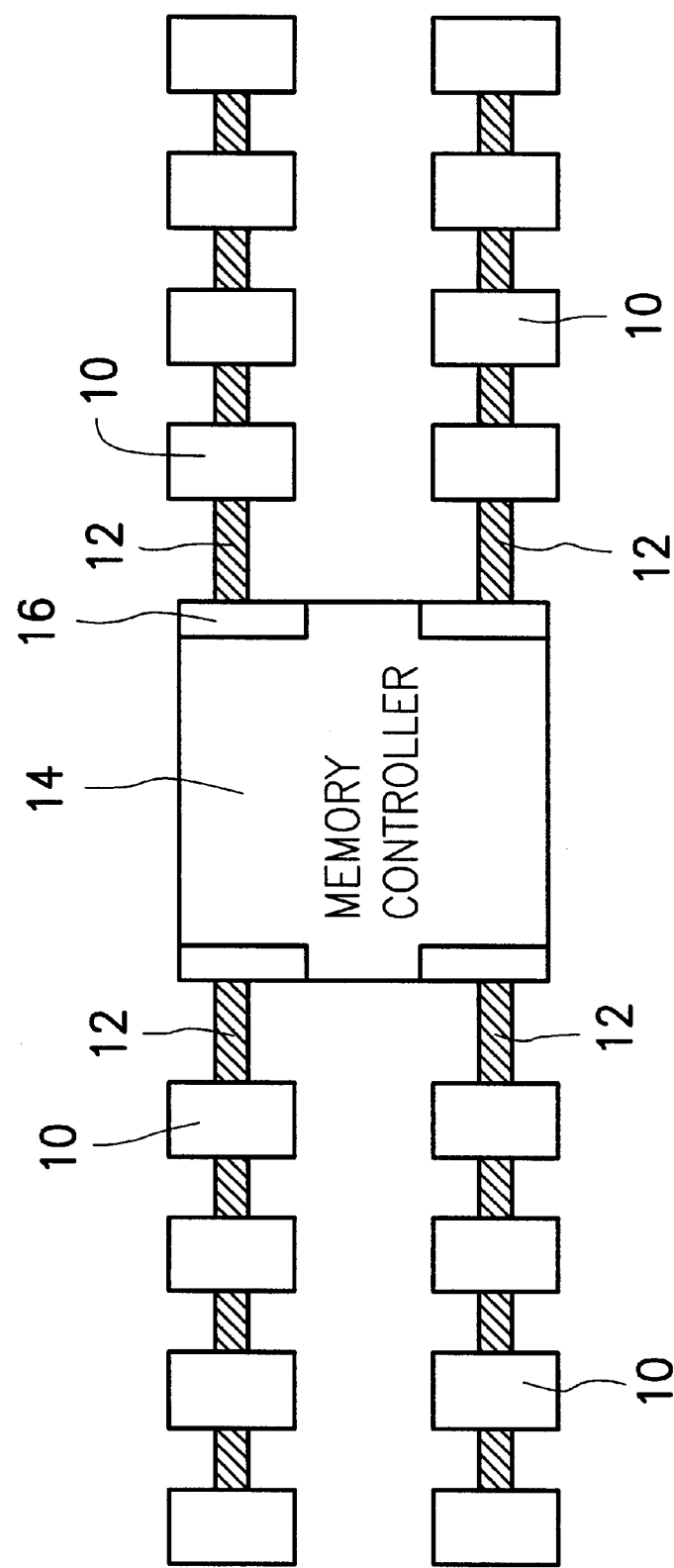
FIGS. 1A, 1B and 1C are respectively a four-channel, a two-channel and a single channel direct Rambus channel type of memory and its control interfaces.
Figure 1B:
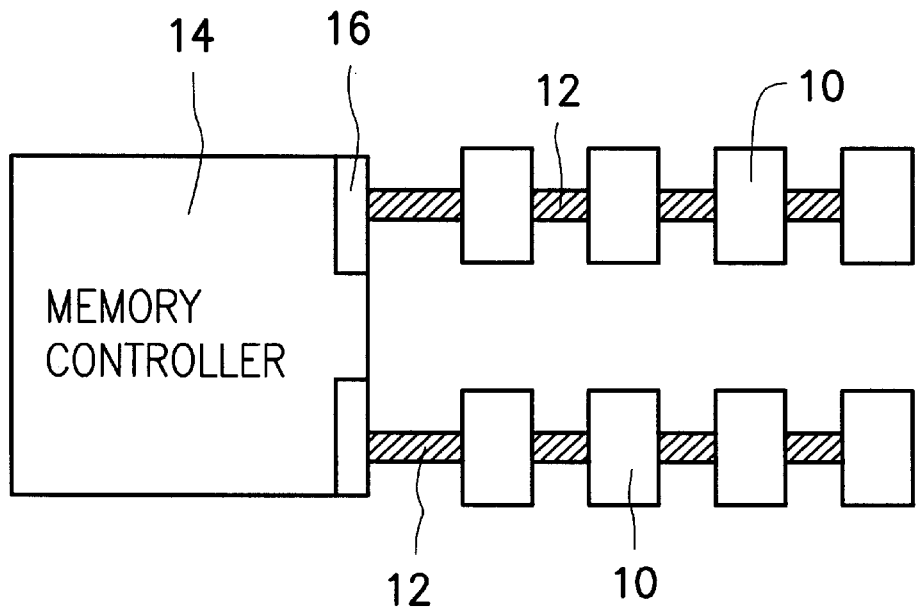
Figure 1C:
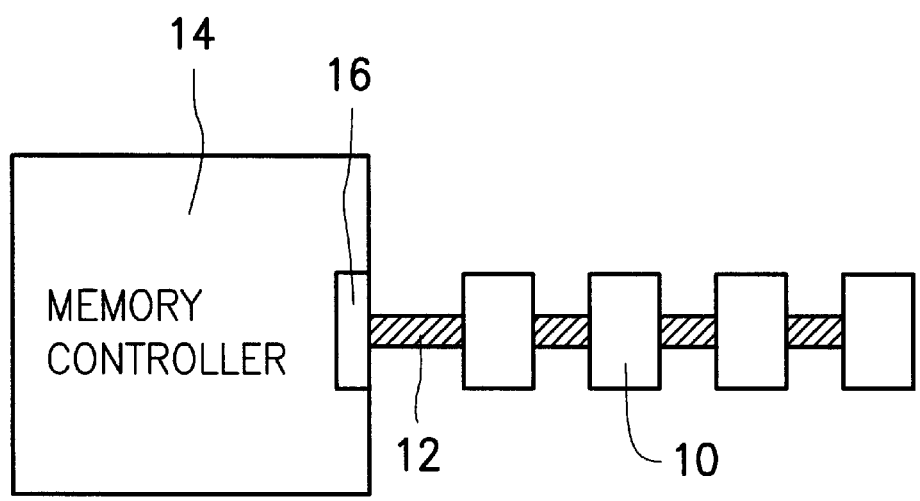
Figure 2A:
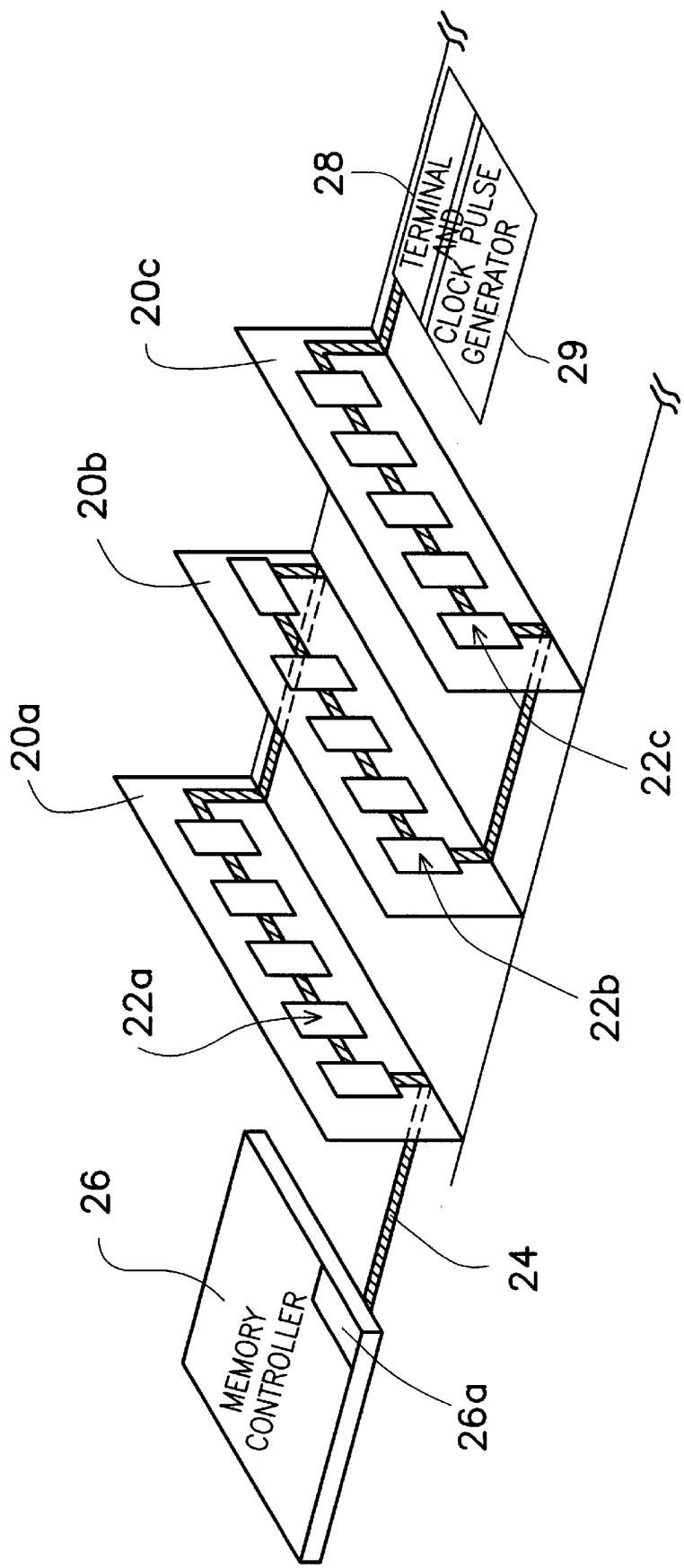
FIG. 2A is a sketch showing the connection of a memory controller, three memory modules, a terminal, a clock pulse generator and their associated signaling channels.
Figure 2B:
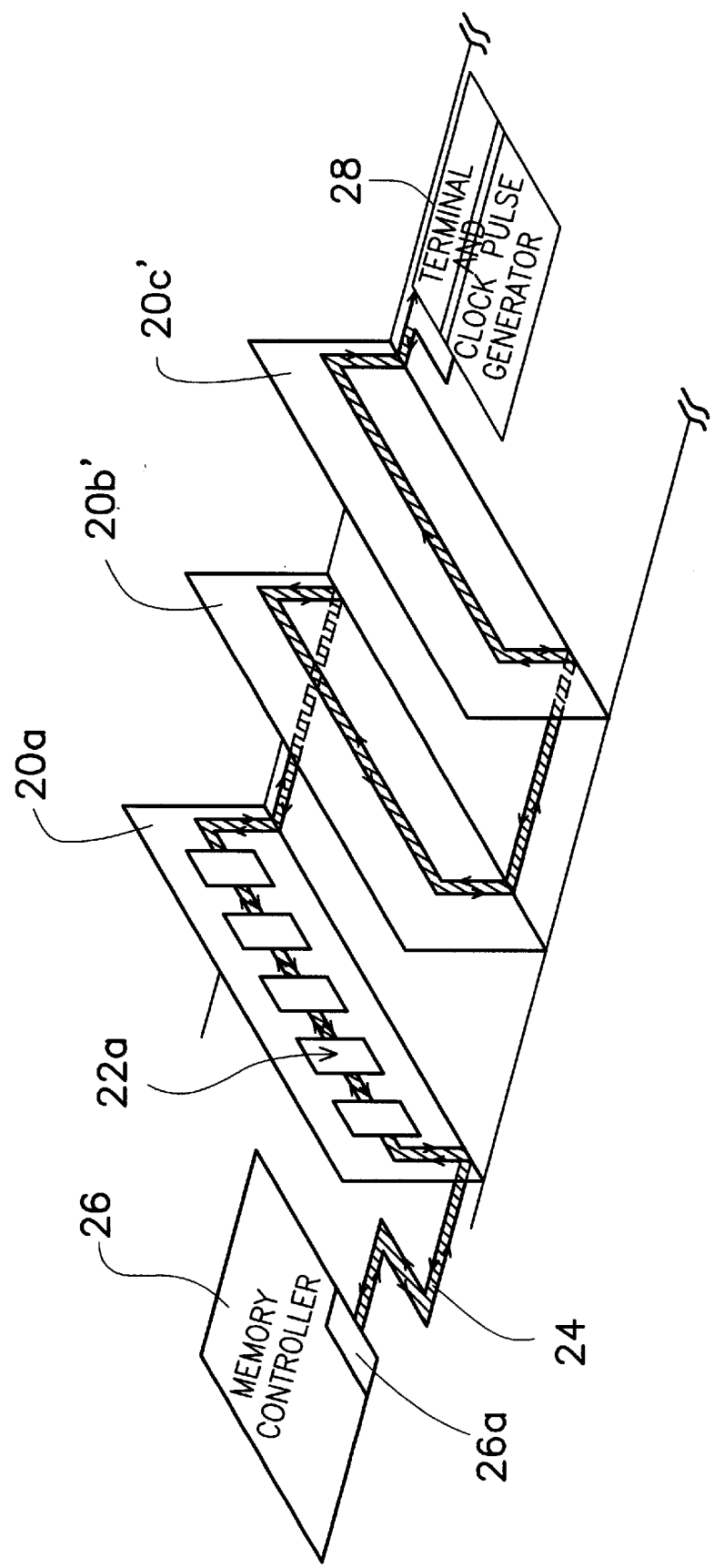
FIG. 2B is a sketch showing the connection of a memory controller, one memory module, two dummy memory modules, a terminal, a clock pulse generator and their associated signaling channels.

Reference will now be made in detail to the present preferred embodiments of the invention, examples of which are illustrated in the accompanying drawings. Wherever possible, the same reference numbers are used in the drawings and the description to refer to the same or like parts.

Figure 3:
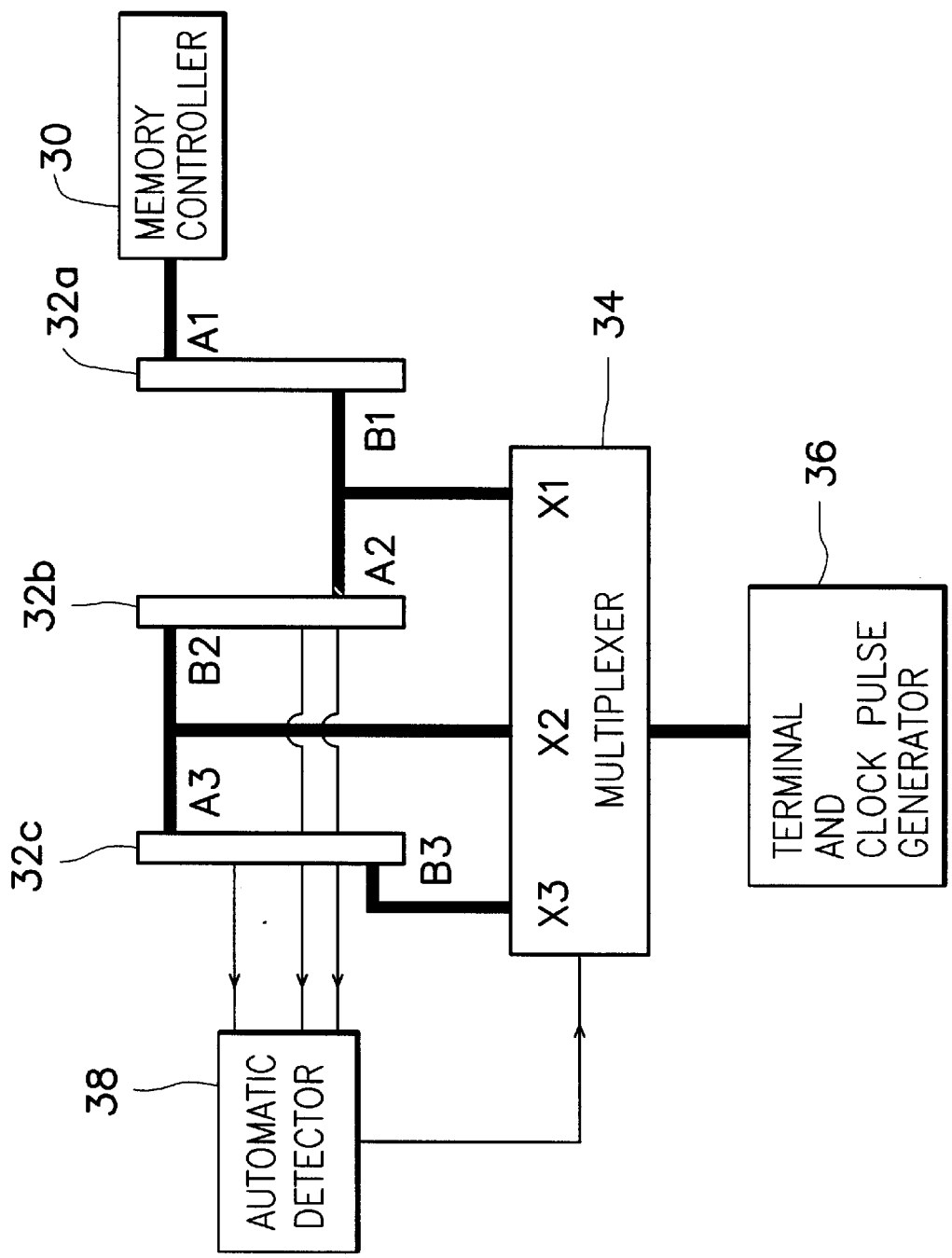
FIG. 3 is a schematic diagram showing the memory module controlling system according to a first preferred embodiment of this invention.

FIG. 3 is a schematic diagram showing the memory module controlling system according to a first preferred embodiment of this invention. The memory module controlling system is suitable for controlling memory modules having a direct Rambus channel configuration with a single terminal device at its very end. In general, the controlling system can be applied to most computer system.

As shown in FIG. 3, the CPU of a PENTIUM II or equivalent computer system, for example, is capable of controlling three RIMM memory modules. Memory access is controlled by a memory controller 30. The memory controller 30 is able to transmit memory addresses, data, control signals or clock pulse signals. Hence, any one of the chips inside any RIMM memory modules can be selected for memory read/write operation. Three separate memory modules can be plugged into three slots 32a, 32b and 32c, respectively. The memory slots 32a, 32b and 32c have input terminals A1, A2 and A3 and output terminals B1, B2 and B3, respectively. The output terminal B1 of the first slot 32a is coupled to the input terminal A2 of the second slot 32b. Similarly, the output terminal B2 of the second slot 32b is coupled to the input terminal A3 of the third slot 32c. The first, second and third RIMM memory slots 32a, 32b and 32c together form a serially connected cascade. Finally, the input terminal A1 of the first slot 32a is coupled to the memory controller 30.

The aforementioned input and output terminals are connected via a bus channel. The bus channel of this invention is designed to interface with a direct Rambus channel type of system. The bus channel is able to transmit memory address, data, controlling signals and clock pulses.

The multiplexer 34 in the controlling system has three input terminals X1, X2, X3 and a single output terminal Y. The output terminals B1, B2 and B3 of the respective slots 32a, 32b and 32c are coupled to the first, the second and the third input terminals X1, X2 and X3 of the multiplexer 34, respectively. In addition, a terminal device 36 is coupled to the output terminal Y of the multiplexer 34. The input terminals of an automatic detector 38 are coupled to the three slots 32a, 32b and 32c, respectively. The automatic detector 38 is used to sense whether a RIMM memory module has plugged into a particular slot. After sensing the slots, a signal regarding the state of occupancy of the memory slots are sent to the multiplexer 34 so that only one of the three slots 32a, 32b and 32c is selected. Hence, signals from only one of the three output terminals B1, B2 and B3 are permitted to pass through the multiplexer 34 into the terminal 36. The terminal device 36 can further includes a terminal and a clock pulse generator. The clock pulse generator is a high-frequency oscillator circuit capable of generating a very high frequency of up to 400 MHz for activating the RIMM memory modules.

The input terminals of the automatic detector 38 are connected to the ground terminals of various slots so that the presence of a RIMM memory module in any slot can be determined.

If memory module is plugged into the first slot 32a only, the automatic detector 38 detects empty connections in slots 32b and 32c. Hence, an output signal regarding state of occupancy for the slots is fed back to the multiplexer 34, and all the signals at the output terminal of the slot 32a are re-directed to the output terminal Y. In other words, the terminal device 36 is connected to the memory module in the first slot 32a, thereby forming a close circuit path. Similarly, when memory modules are plugged into the respective slots 32a and 32b, the automatic detector 38 is able to sense the presence of memory modules in those slots and relay a signal to the multiplexer 34. Hence, the input terminal X2 is connected to the output terminal Y. Finally, if RIMM memory modules are plugged into all three slots 32a, 32b and 32c, the input terminal X3 is connected to the output terminal Y.

By introducing simple circuits to the memory module controlling system in the first embodiment of this invention, the state of occupancy of various memory slots can be detected automatically. Hence, a terminal device is appropriately connected to the very last memory-occupied slot automatically, making the plugging of dummy memory modules into unused slots obsolete. Therefore, the invention is able to save the cost for producing dummy memory modules as well as shorten the time for changing memory modules. In other words, as soon as the memory modules are properly plugged into the slots, the system automatically decides the slot for connecting with a terminal device.

In the first preferred embodiment described above, a three-memory slot system is chosen as an example. However, the actual number of memory slots in a memory module controlling system is not restricted.

The memory module controlling system described in the first embodiment is no doubt quite convenient for users. However, a large number of signaling lines have to be switched inside the multiplexer. For example, memory address, data, controlling signals and clock pulse signals all have to be switched by the multiplexer. Hence, circuits within the multiplexer will be a lot more complicated, and so its cost of production will be higher. To simplify the internal circuitry of a multiplexer, a second embodiment is also provided. This time, only the clock pulse signal needs to be switched inside the multiplexer. The only other additional item is a specially designed dummy RIMM memory module that includes a terminal and a clock pulse circuit.

Figure 4:
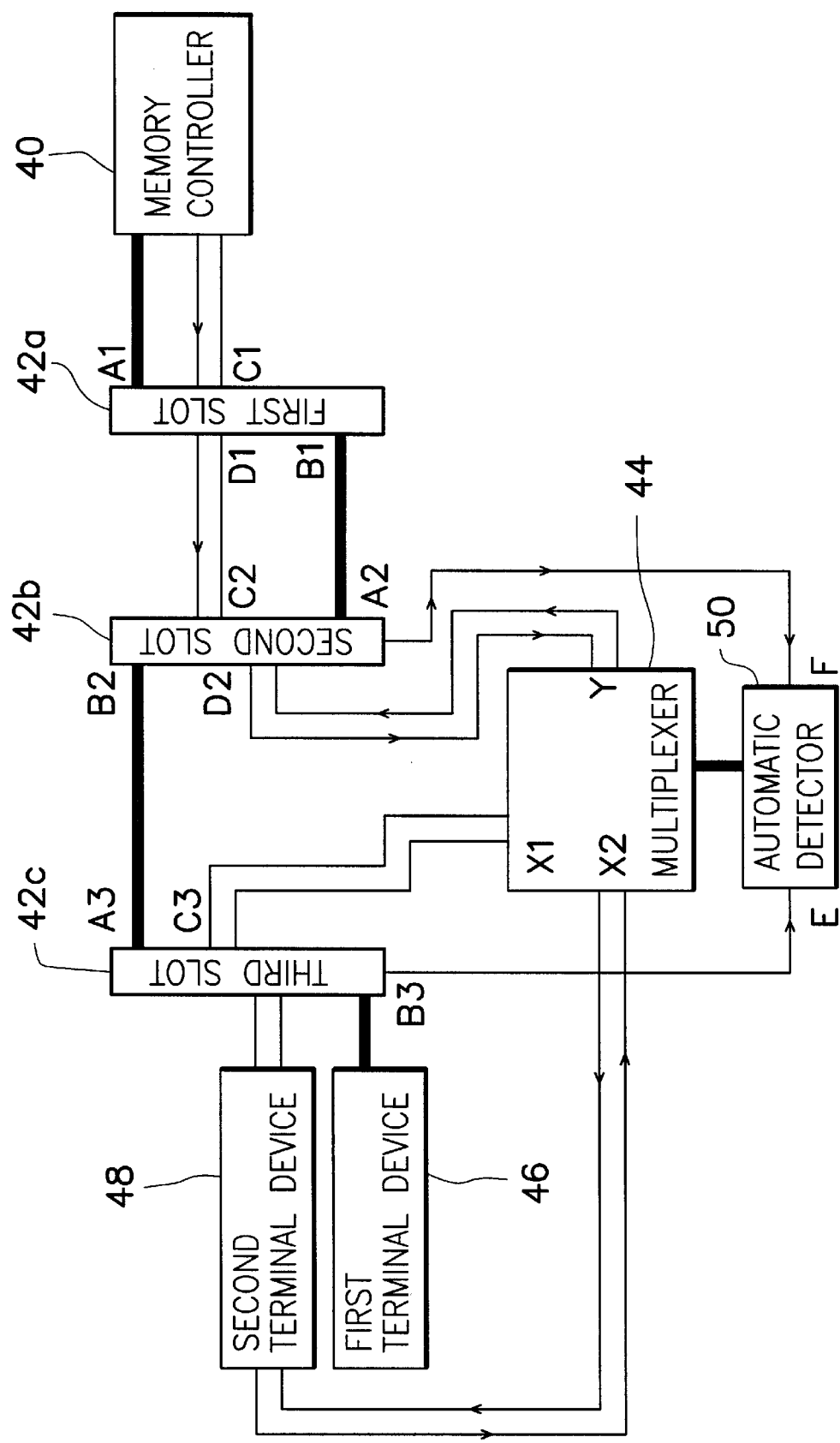
FIG. 4 is a schematic diagram showing the memory module controlling system according to a second preferred embodiment of this invention.

FIG. 4 is a schematic diagram showing the memory module controlling system according to a second preferred embodiment of this invention.

As shown in FIG. 4, a PENTIUM II or equivalent computer system is again used as an example. The CPU of the computer system is capable of controlling three RIMM memory modules. Memory access is controlled by a memory controller 40. The memory controller 40 is able to transmit memory addresses, data, control signals or clock pulse signals. Hence, any one of the chips inside any RIMM memory modules can be selected for a memory read/write operation. Three separate memory modules can be plugged into three slots 42a, 42b and 42c, respectively. The memory slots 42a, 42b and 42c have input terminals A1, A2 and A3 and output terminals B1, B2 and B3, respectively. The output terminal B1 of the first slot 42a is coupled to the input terminal A2 of the second slot 42b. Similarly, the output terminal B2 of the second slot 42b is coupled to the input terminal A3 of the third slot 42c. The first, second and third RIMM memory slots 42a, 42b and 42c together form a serially connected cascade. Finally, the input terminal A1 of the first slot 42a is coupled to the memory controller 40.

In addition, the memory slots 42a, 42b and 42c have clock input terminals C1, C2, C3 and clock output terminals D1, D2, D3, respectively. The clock input terminal C1 of slot 42a is coupled to the memory controller 40, and the clock output terminal D1 is coupled to the clock input terminal C2 of the slot 42b. The multiplexer 44 had a first input terminal X1, a second input terminal X2 and an output terminal Y. The output terminal Y is coupled to the clock output terminal D2 of the second slot 42b, and the first input terminal X1 is coupled to the clock input terminal C3 of the third slot 42c. A first clock terminal device 46 is coupled to the signal output terminal B3 of the third slot 42c. Similarly, a second clock terminal device 48 is coupled to the clock output terminal D3 of the third slot 42c as well as the second input terminal X2 of the multiplexer 44.

The automatic detector 50 has a first signal input terminal E and a second signal input terminal F. The first signal input terminal E is coupled to the third slot 42c while the second signal terminal F is coupled to the second slot 42b. The automatic detector 50 is able to detect the presence or absence of memory module in the second and the third slots 42b and 42c and then returns a memory status signal to the multiplexer 44. When the multiplexer 44 receives a status signal indicating the presence of a dummy memory module in the second slot 42b, the multiplexer 44 connects the second input terminal X2 to its output terminal Y. On the other hand, if the multiplexer 44 receives a status signal indicating the presence of a dummy memory module in the third slot 42c, the multiplexer 44 connects the first input terminal X1 to its output terminal Y. With this arrangement, a complete clock signaling circuit linking all the memory modules is established.

In the aforementioned second embodiment of this invention, by using rather simple circuit and plugging in a specially designed dummy memory module, an automatic detector is able to detect the state of occupancy of the memory slots. Consequently, a clock terminal device is automatically connected to the clock output terminal of the dummy module occupied slot. Since the multiplexer needs only to function as a selector for redirecting clock pulse signals, its internal circuitry is much simpler. In other words, as long as memory modules are properly plugged into the memory slots and a dummy memory module is plugged into the next unused memory slot, the memory module controlling system of this invention can automatically determine the memory slot for connecting with a clock terminal device.

In the second preferred embodiment described above, a three-memory slots system is chosen as an example. However, the actual number of memory slots in a memory module controlling system is not restricted.

In summary, the first major characteristic of this invention is the utilization of a simple multiplexer and an automatic detector for determining the slot to be connected to a terminal device. Hence, there is no need to plug in dummy memory modules into all unused memory slots.

Another characteristic of this invention is the utilization of an even simpler multiplexer, an automatic detector and a specially designed dummy memory module for automatically connecting a clock terminal device to the clock output terminal of the dummy module slot.

A third characteristic of this invention is the utilization of very simple circuits and components in the memory module controlling system. Hence, the production cost of controlling system is comparatively low.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory module controlling system, comprising:
   a memory controller;
   a first, a second and a third slots, each having a signal input terminal and a signal output terminal, wherein the signal output terminal of the first slot is coupled to the signal input terminal of the second slot, the signal output terminal of the second slot is coupled to the signal input terminal of the third slot, the signal input terminal of the first slot is coupled to the memory controller, and the first, the second and the third slots form a serially connected cascade structure;

a multiplexer, having a first, a second, a third input terminal and an output terminal, wherein the signal output terminals of the first, the second and the third slots are coupled to the first, the second and the third input terminals of the multiplexer, respectively;

a terminal device, coupled to the output terminal of the multiplexer; and an automatic detector, coupled to the first, second and third slots for detecting a status signal of whether a memory module is plugged in, so as to transmit an output signal to the terminal device by selecting via the multiplexer one of the signal output terminals of the first, second, and third slots according to the status signal.

2. The memory module controlling system of claim 1, wherein the terminal device further includes a terminal and a clock pulse generator.

3. The memory module controlling system of claim 2, wherein the clock pulse generator can produce high frequency signals of about 400 MHz.

4. The memory module controlling system of claim 1, wherein the connection between the first, the second and the third slots, the connection between the signal output terminals of the first, the second and the third slots and the input terminals of the multiplexer, and the connection between the first slot and the memory controller are all achieved through an interface bus.

5. The memory module controlling system of claim 4, wherein the interface bus has a design that fits the operating protocols of a Rambus channel.

6. The memory module controlling system of claim 1, wherein the memory slots are designed to fit in RIMM memory modules that operate according to the protocols of a direct Rambus channel.

7. A memory module controlling system, comprising:

a memory controller;

a first, a second and a third slot, each of which having a signal input terminal, a signal output terminal, a clock input terminal and a clock output terminal, wherein the signal input terminal of the first slot is coupled to the memory controller, the signal output terminal of the first slot is coupled to the signal input terminal of the second slot, the signal output terminal of the second slot is coupled to the signal input terminal of the third slot, the clock input terminal of the first slot is coupled to the memory controller, and the clock output terminal of the first slot is coupled to the clock input terminal of the second slot;

a multiplexer, having a first input terminal, a second input terminal and an output terminal such that the output terminal of the multiplexer is coupled to the clock output terminal of the second slot while the first input terminal of the multiplexer is coupled to the clock input terminal of the third slot;

a first terminal device, coupled to the signal output terminal of the third slot;

a second terminal device coupled to the clock output terminal of the third slot as well as the second input terminal of the multiplexer; and an automatic detector having a first and a second signal input terminal coupled to the second slot and the third slot respectively for detecting a status signal of whether a memory module is plugged in the second and the third slots, so as to output a status signal to the multiplexer, wherein when the status signal indicates that a dummy memory module is plugged into the second slot, the multiplexer automatically connects its second input terminal to its output terminal, and if the returned status signal indicates that a dummy memory module is plugged into the third slot, the multiplexer automatically connects its first input terminal to its output terminal.

8. The memory module controlling system of claim 7, wherein the second terminal device further includes a clock pulse terminal and a clock pulse generator.

9. The memory module controlling system of claim 8, wherein the clock pulse generator can produce high frequency signals of about 400 MHz.

10. The memory module controlling system of claim 7, wherein the first terminal device includes a data bus terminal.

11. The memory module controlling system of claim 7, wherein a serial connection between the first, the second and the third slots as well as the connection between the first slot and the memory controller are all achieved through an interface bus.

12. The memory module controlling system of claim 11, wherein the interface bus has a design that fits the operating protocols of a Rambus channel.

13. The memory module controlling system of claim 7, wherein the dummy memory module includes a terminal circuit and a clock pulse circuit.

14. A memory module controlling system, comprising:

a memory controller;

a plurality of slots, each having a signal input terminal and a signal output terminal such that each signal output terminal of a slot is coupled to the signal input terminal of the following slot, so that the slots form a serially connected cascade structure, wherein the input terminal of the very first slot is coupled to the memory controller;

a multiplexer having a plurality of input terminals and an output terminal, wherein each signal output terminal of the slots is coupled to a corresponding input terminal of the multiplexer;

a terminal device coupled to the output terminal of the multiplexer; and an automatic detector coupled to the slots for detecting a status signal of whether a memory module is plugged in the slots, so as to select a signal output terminal of the slots coupled to one of the inputs of the multiplexer for transmission to the terminal device.

15. The memory module controlling system of claim 14, wherein the terminal device further includes a terminal and a clock pulse generator.

16. The memory module controlling system of claim 15, wherein the clock pulse generator can produce high frequency signals of about 400 MHz.

17. The memory module controlling system of claim 14, wherein the serial connection between the slots, the connection between the signal output terminals of the slots and the input terminals of the multiplexer, and the connection between the first slot and the memory controller are all achieved through an interface bus.

18. The memory module controlling system of claim 17, wherein the interface bus has a design that fits the operating protocols of a Rambus channel.

19. The memory module controlling system of claim 14, wherein the memory slots are designed to fit in RIMM memory modules that operate according to the protocols of a direct Rambus channel.

* * * * *